Patented July 23, 1946 2,404,585

UNITED STATES PATENT OFFICE 2,404,585

LATEX ACTIVATOR

Ernst Schmidt, Akron, Ohio, assignor to The Firestone Tire & Rubber Company, Akron, Ohio, a corporation of Ohio No Drawing. Application August 11, 1945,
Serial No. 610,398

3 Claims. (Cl. 260—776)

This invention relates to latex compounding. More particularly, it relates to the use of red lead oxide instead of zinc oxide as an activator for vulcanization of latex accelerated by a benzothiazyl compound.

The term "benzothiazyl" is used herein to describe the so-called Captax-type of accelerator, Captax being the trade-name for mercaptobenzothiazole. Derivatives which coagulate latex are not suitable for use in this invention, but compounds which are suitable include the sodium, amomnium, etc., salts, benzothiazyl disulfide, cyclohexyl benzothiazyl sulfenamide, etc.

It has been realized that zinc oxide is not altogether satisfactory for compounding with latex because it renders the latex unstable. The zinc oxide cannot be omitted from latex without replacing it with some activator. According to this invention it is replaced entirely or largely by red lead oxide ($Pb_3O_4$).

In compounding latex with red lead for comparison with latex compounded with zinc oxide, it has been assumed that the activation is due to the metal, and equivalent proportions of the two metals are used in the following formulae.

The comparison recorded below was made with 5 parts of zinc oxide and 13.7 parts of red lead oxide. The accelerator used with the black was tetraethanol ammonium Captax solution (24.4 per cent Captax). The black was a reinforcing black added as a 40 per cent dispersion. The latex was 60 per cent solids. The amounts are parts by weight.

|  | A | B | C | D | E | F | G | H |
|---|---|---|---|---|---|---|---|---|
| Latex, 60% | 167 | 167 | 167 | 167 | 167 | 167 | 167 | 167 |
| Black, 40% |  |  |  |  |  |  | 93.95 | 93.95 |
| Zinc oxide, 50% | 5 | 5 | 5 |  |  |  | 5 |  |
| $Pb_3O_4$, 50% |  |  |  | 13.7 | 13.7 | 13.7 |  | 13.7 |
| Sulfur, 50% | 4 | 4 | 4 | 4 | 4 | 4 | 4 | 4 |
| Ammonium Captax (27.5% Captax) | 2.73 | 3.64 | 4.55 | 2.73 | 3.64 | 4.55 |  |  |
| T. E. A. Captax (24.5% Captax) |  |  |  |  |  |  | 3.07 | 3.07 |

The zinc-oxide-containing compound was fluid and stable for only about 10 minutes, and the test slabs, therefore, had to be cast in a hurry. The lead-oxide-containing compound was thin and so stable it could be stored for days with very little change in stability. The activator was dispersed by ball-milling with 4 per cent of Darvan (a dispersing agent) before adding to the latex. The particles of lead oxide and zinc oxide in dispersed form were about the same size.

Pure gum compounds containing red lead oxide are an intense orange color which turns to black on curing.

Test slabs were obtained by drying the latex on glass plates. All slabs were dried one week at room temperature in the open and then one week in the dessicator. Below are recorded the results of tests on the physical properties of samples press-cured at 275° F. for 20, 40, 60, and 80 minutes, respectively, as indicated. The amount of accelerator figured as Captax is given to make the table most informative.

| Captax | Cure | Formula | | | | | | | |
|---|---|---|---|---|---|---|---|---|---|
|  |  | A | B | C | D | E | F | G | H |
|  |  | Pure gum compounds | | | | | | Black compounds | |
|  |  | Zinc oxide | | | Red lead oxide | | | ZnO | $Pb_3O_4$ |
|  |  | 0.75% | 1.0% | 1.25% | 0.75% | 1.0% | 1.25% | 0.75% | 0.75% |
| Elongation | 20 | 720 | 730 | 735 | 820 | 815 | 770 | 610 | 675 |
|  | 40 | 730 | 760 | 740 | 730 | 770 | 760 | 580 | 590 |
|  | 60 | 730 | 730 | 700 | 750 | 770 | 720 | 600 | 625 |
|  | 80 | 750 | 770 | 725 | 750 | 765 | 720 | 630 | 570 |
| 200% modulus | 20 | 60 | 140 | 140 | 75 | 100 | 50 | 440 | 350 |
|  | 40 | 70 | 145 | 180 | 80 | 145 | 100 | 485 | 420 |
|  | 60 | 85 | 150 | 125 | 100 | 130 | 100 | 500 | 405 |
|  | 80 | 80 | 150 | 150 | 100 | 150 | 100 | 580 | 475 |
| 400% modulus | 20 | 215 | 335 | 330 | 200 | 230 | 250 | 1,315 | 1,100 |
|  | 40 | 280 | 315 | 460 | 260 | 290 | 270 | 1,450 | 1,350 |
|  | 60 | 250 | 330 | 300 | 250 | 275 | 200 | 1,370 | 1,200 |
|  | 80 | 250 | 300 | 325 | 300 | 300 | 230 | 1,440 | 1,400 |
| 600% modulus | 20 | 1,220 | 1,320 | 1,160 | 890 | 1,015 | 1,050 | 3,460 | 3,000 |
|  | 40 | 1,145 | 1,110 | 1,540 | 1,300 | 1,375 | 1,325 |  | 3,520 |
|  | 60 | 1,060 | 1,120 | 970 | 1,425 | 1,375 | 1,200 | 3,450 | 3,220 |
|  | 80 | 1,030 | 925 | 1,100 | 1,500 | 1,410 | 1,290 | 3,515 |  |
| Tensile | 20 | 2,790 | 3,185 | 3,130 | 4,000 | 4,030 | 3,525 | 3,650 | 3,985 |
|  | 40 | 3,050 | 3,350 | 3,850 | 3,550 | 4,220 | 3,725 | 3,125 | 3,470 |
|  | 60 | 3,250 | 2,580 | 3,040 | 4,100 | 4,250 | 3,730 | 3,485 | 3,550 |
|  | 80 | 2,940 | 2,915 | 2,850 | 3,880 | 4,230 | 3,500 | 3,800 | 3,240 |

Other compounding ingredients may be utilized. Fillers, etc., may be added. The latex used need not be concentrated. Other compounding ingredients than those specified may be employed. Modifications are permissible within the scope of the appended claims.

What I claim is:

1. Latex containing sulfur, a benzothiazyl accelerator, substantially free of zinc oxide and containing red lead oxide in an amount sufficient to activate the accelerator.

2. Vulcanized rubber deposited from latex, vulcanized in the presence of a benzothiazyl accelerator, substantially free from zinc oxide and containing sufficient red lead oxide to activate the accelerator.

3. The process of vulcanizing latex rubber which comprises vulcanizing with sulfur and a benzothiazyl accelerator in the presence of red lead oxide as an activator.

ERNST SCHMIDT.